United States Patent [19] [11] 3,784,756
Nemchik [45] Jan. 8, 1974

[54] SUBSCRIBER LOOP RANGE EXTENDER

[75] Inventor: Joseph Michael Nemchik, Lake Hiawatha, N.J.

[73] Assignee: Bell Telephone Laboratories, Incorporated, Murray Hill, N.J.

[22] Filed: Dec. 15, 1972

[21] Appl. No.: 315,489

[52] U.S. Cl. .......... 179/16 F, 179/17 A, 179/16 EA
[51] Int. Cl. .......... H04g 1/30
[58] Field of Search .......... 179/16 F, 16 E, 18 HF, 179/170 R, 18 HB, 81 R, 84 A, 16 EA

[56] References Cited

UNITED STATES PATENTS 3,671,676 6/1972 Henry et al. .......... 179/16 F

OTHER PUBLICATIONS

"REG Circuits Extend Central Office Service Areas" by J. C. Burgiel and J. L. Henry, Bell Laboratories Record, Sept. 1972, pages 243–247.
"Customer Lines Go Electronic" by F. T. Andrews, Jr., Bell Laboratories Record, Feb. 1972, pages 59–65.

*Primary Examiner*—Kathleen H. Claffy
*Assistant Examiner*—Joseph A. Popek
*Attorney*—J. K. Mullarney

[57] ABSTRACT

This disclosure relates to a range extender having a through transmission path, a voice transmission path including a repeater, a relay for transferring back and forth between paths and a dual mode, loop current detector. In the idle state, the current detector is in a "slow" mode for the purpose of preventing (spurious) operation of the detector, except in response to an off-hook current flow. The transfer relay connects the repeater to the loop immediately after an off-hook is detected and the current detector is switched to its "fast" mode in preparation for dialing pulsing. The repeater normally remains connected to the loop for the duration of the call, even over dial pulsing. Dial pulsing is therefore repeated via the repeater, and not shunt aided. The dial pulses are detected by the fast current detector and the office loop is opened and closed through the repeater, which, from the office side, looks like a low resistance (1K) to low frequencies.

7 Claims, 3 Drawing Figures

SUBSCRIBER LOOP RANGE EXTENDER

BACKGROUND OF THE INVENTION

The present invention relates to telephone systems and more particularly to a range extender circuit for improving signaling and transmission on long subscriber loops.

The customer or subscriber loop — that portion of the telephone circuit between the central office and the customer's telephone set — usually consists of a twisted pair of wires. In the utization of such two-wire circuits for telephone transmission purposes, a maximum tolerable limit in terms of total circuit resistance (generally proportional to total physical distance) between the customer's equipment and the central office is frequently encountered. That is, the longer the loop, the greater the attentuation and distortion of telephone signaling and transmission. Basically, signaling is the transfer of non-voice information that controls the processing of a call. For example, it includes dial pulsing, supervision, ringing, and tripping of the ringing (disconnecting the ringing) when a call is answered. Long loops impair signaling in two ways. First, because of the higher electrical resistance encountered, current in the loop may be reduced until, ultimately, central office relays may not operate. Second, trains of dial pulses become distorted. The transmission of voice signals can also be degraded in two ways; first, loss in the long loop reduces the overall level, and second, because of the higher resistance in the loop, the telephone transmitter no longer receives enough current to insure good operation. Various solutions have been proposed heretofore to overcome the difficulties in signaling and/or voice transmission over long loops, and, hopefully, to do so at a reasonable cost.

A particularly advantageous solution to the long loop problem in the REG (Range Extender with Gain) circuit disclosed in the article entitled "REG Circuits Extend Central Office Service Areas" by J. C. Burgiel and J. L. Henry, *Bell Laboratories Record*, Sept. 1972, pages 243–247. The REG circuit takes particular advantage of the fact that the signaling and voice transmission do not occur at the same time. Separate paths through the REG, each with appropriate circuitry, is therefore used to assist each of these functions. A transfer relay switches back and forth between the two paths. In this way, voice gain and signaling extension remain mutually exclusive. The transfer relay is controlled by a logic and timing circuit which interprets line current and voltage information sent from detector circuits. The REG circuit is disclosed in detail in U.S. Pat. No. 3,671,676 issued to J. L. Henty and L.G. Schimpf on June 20, 1972.

The basic signaling problem in long loops is that there may not be enough line current to assure operation of central office relays. In the REG, relay operation is assured by inserting a resistive shunt across the line in step with dial pulses and other signals. The shunt supplements the current drawn through the telephone set and makes the loop appear electrically as if its length were normal (around 1,000 ohms). For this purpose, the REG utilizes a "fast" current detector to detect dial pulses as well as the initial off-hook on an originating call. This use of a fast current detector, however, leads to three potential problems. First, during line testing, large unbalanced transient currents are impressed on the loop. Unfortunately, the current detector may react and place a shunt across tip and ring, for several milliseconds, causing an erroneous reading by the tester. Second, when the loop operates with high 60 Hz longitudinal voltage levels, the unbalanced line circuits of certain central offices may cause enough induced metallic current to operatively place the resistive shunt across tip and ring and thereby seize the office marker, for example. Last, the current surge caused when ringing voltage is connected on a terminating call may cause a momentary shunting of the line thus leading to a reduction of the margin against premature ring trip.

It is, accordingly, a primary object of the present invention to avoid any erroneous shunting of the line without adversely affecting the rapidity of dial pulse detection.

In the range extender circuits heretofore proposed, dial pulsing is typically shunt aided; that is, the pulsing relay current is the sum of the loop current and the current in the resistive shunt path. Now as sometimes happens, the closure of either path alone can operate the pulsing relay of the central office. Thus, a delay in the operation of the relay that controls the shunt path (and some delay is inevitable) results in an overlap in pulsing relay current which reduces the break time of the contacts of that relay. This break time can be so reduces that the digits are badly mutilated and dialing errors result.

It is therefore a further object of the invention to overcome the problems associated with shunt aided, dial pulsing.

As indicated above, the REG circuit provides separate paths for signaling and voice transmission and a transfer relay continually switches back and forth between the two paths during a call sequence. Now relays constitute the chief repair problem in the telephone plant and this continual switching back and forth of the transfer relay aggravates the repair problems associated with the same. Moreover, the transfer relay of the REG drops and then reoperates for each dialed digit and a resulting click is produced for each digit.

It is therefore a further object of the invention to provide a range extender wherein the switching between the through transmission path and the voice transmission path is kept to an absolute minimum.

A still further object of the present invention is to provide a range extender of improved performance, yet of less complexity and of concomitantly lower cost.

SUMMARY OF THE INVENTION

A range extender in accordance with the present invention comprises a "signaling" or through transmission path, a voice transmission path having a repeater (i.e., an amplifier), a relay for transferring back and forth between paths and a loop current detector. The loop current detector of the invention has a dual mode capability. In the idle state, the current detector is in its "slow" mode and the various currents, heretofore described, that can cause an erroneous shunting of the line are effectively filtered out. That is, with the slow current detector in use, the only current normally detected is the loop current that flows when the subscriber goes off-hook. The transfer relay connects the repeater to the loop immediately after an off-hook is detected by the current detector. The through path is also opened at this time and the loop current detector is switched to its "fast" mode in preparation for dial pulsing. Except for an ANI (automatic number identification) tip party test, the repeater normally remains connected to the loop for the duration of the call, even over dial pulsing, and the through path accordingly remains disabled. Dial pulsing is therefore repeated in the present range extender, not shunt aided since there is no dc path between the central office and the subscriber's set. The dial pulses are detected by the fast current detector and the office loop is opened and closed through the repeater circuit, which, from the office side, looks like a low resistance (1K) to low frequencies. The range extender holds supervision through the repeater input, while loop current is drawn from a boosted talk battery fed through a repeater coil.

In accordance with a feature of the invention, an optoelectronic coupler is connected in the repeater circuit so as to detect an ANI tip party test. Upon detection, the coupler delivers an appropriate signal to the transfer relay causing an immediate disconnect of the repeater and concurrently placing the through path in the loop. When the test is terminated, the range extender circuit will operate just as it does on an initial off-hook.

BRIEF DESCRIPTION OF THE DRAWINGS

The invention will be more fully appreciated from the following detailed description when the same is considered in connection with the accompanying drawings in which.

DETAILED DESCRIPTION

Figure 1:
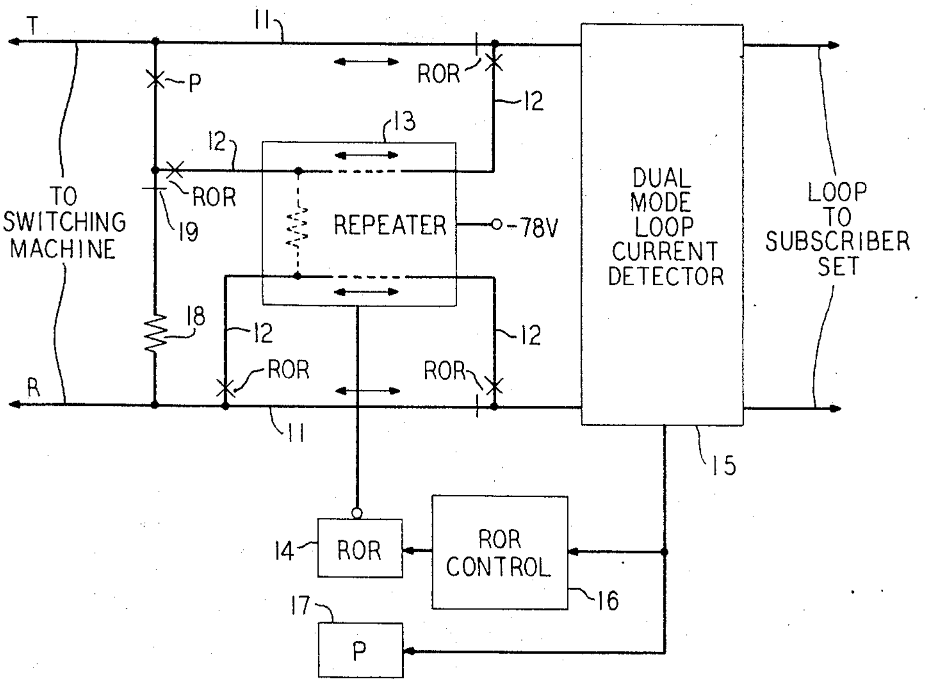
FIG. 1 is a simplified schematic block diagram of a range extender in accordance with the principles of the present invention.

Referring now to the drawings wherein like reference numerals designate like or corresponding parts throughout the several views, FIG. 1 illustrates a range extender, in accordance with the invention, connected in a long subscriber loop intermediate a central office switching machine and a remote subscriber's telephone set. The range extender is typically installed in the central office by connecting it in series with the subscriber loop. In terms of physical arrangement, the range extender of the invention is modularized and mounted on a printed wiring board suitable for shelf-mounting. In most cases a cluster of such units, each connected to a different subscriber loop, is located in the serving central office but may also be located in an intermediate central office (particularly when used in tandem), or perhaps even in an equipment enclosure located outside the central office. The place of a range extender in a central office environment is well known to those in the art and well documented in the literature (see the aforementioned patent to Henry-Schimpf) and therefore does not warrant extensive elaboration herein.

The range extender illustrated in FIG. 1 comprises a "signaling" or through transmission path 11; a voice transmission path 12 having a repeater 13; a ROR (repeater operate relay) circuit 14 for transferring back and forth between the aforementioned paths by means of the "make" and "break" ROR relay contacts; a dual mode, loop current detector 15 having a slow (e.g., 150 milliseconds) current detection mode and an alternative, fast (e.g., 5 milliseconds) current detection mode; a ROR control circuit 16 for operatively enabling or energizing the ROR relay in response to a current detection output signal; and a P relay circuit 17 for dial pulse repeating purposes.

The range extender circuit of the invention can perhaps best be explained by considering the operation thereof in response to a typical call sequence. On an originating call, when the subscriber goes off-hook a loop current flows through the tip and ring conductors T and R. In the idle state (i.e., on-hook), the loop current detector 15 is in its slow mode and the through transmission path 11 is connected in the loop. Accordingly, approximately 150 ms after off-hook, the slow current detector 15 delivers an enabling or energizing signal to the P relay circuit 17 which serves to place the (1K) resistance 18 across the loop, thus guaranteeing operation of the switching system line relay. As will be more evident hereinafter, the primary purpose of the shunt resistance 18 is to trip ringing quickly and very shortly after it is placed across the loop it is dropped by the operation of the ROR relay. Dynamic hysteresis is built into the circuitry such that the P relay is held on for approximately 40 ms after it is actuated, and correspondingly it remains off for an equivalent period after it is dropped.

The current detector output signal also operates the ROR relay through the ROR control circuit 16. The circuit 16 serves to operate the ROR relay almost immediately (i.e., <30 ms) after receipt of the off-hook current detection signal from the detector 15, but it delays the drop of the relay by about 200 ms if loop current is removed. Thus, the ROR control circuit holds the ROR relay up (i.e., energized) over dial pulsing and it will not drop until a loop break of 200 ms which is much longer than the longest possible dial break..

The operation of the ROR relay produces a number of results. First, the break contact 19 of the same serves to open the resistive shunt path temporarily established via resistance 18. The single contact, P relay operates more rapidly than the heavy duty, transfer relay ROR and therefore the resistive shunt path is first placed across the office side of the loop by the operation of the P relay and then shortly thereafter (e.g., about 20 ms on the average) the path is opened by the break contact 19 of the ROR relay. The ROR relay when operated also connects the repeater 13 to the loop, it opens the through transmission path and it switches the loop current detector to its fast mode in preparation for dial pulsing. As will be covered hereinafter, with the repeater on line, a voice frequency amplifier is connected to the loop and a boosted talk voltage (−78 V) is applied to the subscriber side of the loop through the repeat coil; from the office side, the repeater amplifier looks like a 1,000 ohm resistance to low frequencies (as indicated by the resistance in dotted outline in FIG. 1). This resistance is low enough to hold up the line relay or ferrod until the connection of the central office pulsing circuit is initiated.

In accordance with the invention, the range extender remains in the voice transmission mode even over dial pulsing, with the latter being repeated by the P relay. The dial pulses are detected by the loop current detector 15 (now in its fast mode) and the office loop is opened and closed by the make contact of the P relay through the 1,000 ohm amplifier circuit with a delay of about 20 ms. This delay is due to an integration effect (e.g., charging time of capacitors) in the circuitry and it provides good noise immunity consistent with central office pulsing requirements. In the prior art range extenders where dial pulsing is shunt aided, such a delay results in an overlap in pulsing relay current, as heretofore described, and a compromise between good noise immunity and adequate relay contact break time must be resorted to —resulting in a just barely acceptable solution.

With the receipt of the dial pulses by the central office, ringing is quickly applied to the called subscriber's loop. The range extender associated with the latter is, of course, in the idle state and, therefore, the slow current detector is operational. Accordingly, any current surges occurring due to the connection of ringing will not cause the P relay to place the resistive shunt across the loop even for a short time, as has been the case heretofore. Such current surges are effectively filtered out by the slow current detector of the invention.

When the called subscriber answers, the current detector senses the dc component of the loop current within a given period (e.g., 150 ms) and it delivers an enabling signal to the P relay which quickly places a resistance (18) shunt path across the loop, thus tripping ringing. Shortly after ringing is tripped, the ROR relay is energized to open the shunt path and placed the repeater on line, all as previously described. Supervision is held in the same way as on an originating call.

When a subscriber hangs up, the P relay releases which initiates disconnect by the office. Then approximately 200 ms later the ROR relay drops, returning the range extender to the idle state.

On an originating call the two party service equipped with ANI (automatic number identification), the through transmission path 11 must be connected in the loop to permit the ANI tip party test to be made by the office. When a tip party test is to be made, the switching machine shorts tip and ring and connects them to −48 V through the party test relay. With tip and ring shorted, the repeater amplifier current, of course, goes to zero. This current step is detected, in a manner to be described hereinafter, and an appropriate signal is coupled from the repeater circuit 13 to the ROR relay circuit 14 so as to cause the ROR relay to drop immediately (i.e., < 10 ms) and thereby place the through transmission path 11 in the loop. When the T-R short is removed, the range extender circuit operates just as it does on initial off-hook.

Figure 2:
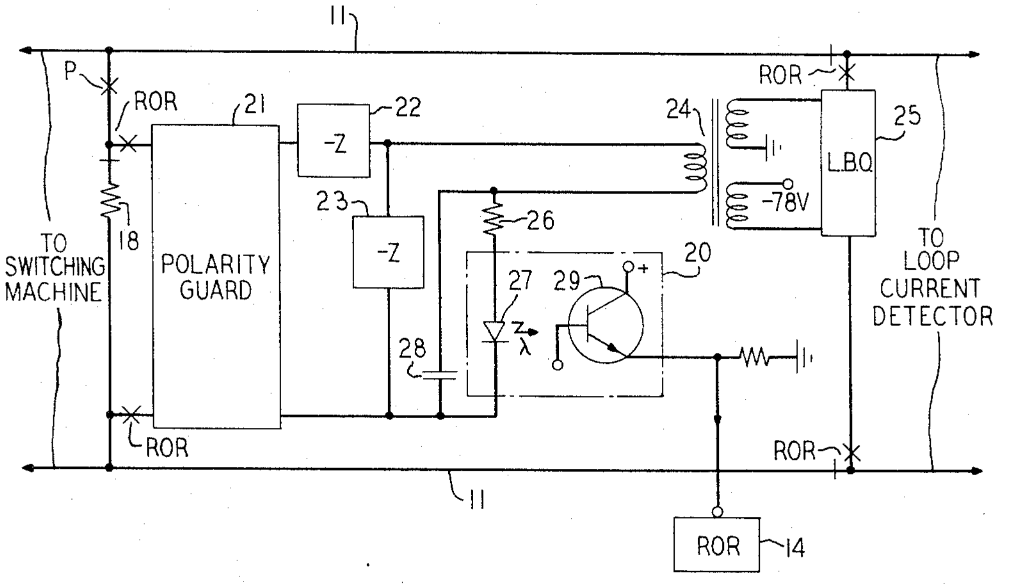
FIG. 2 is a schematic diagram, partly in block form, of the repeater circuit of FIG. 1.

With the range extender in the voice transmission mode, the repeater circuit shown in FIG. 2 is connected in the loop. The repeater circuit comprises a polarity guard 21, a series negative impedance gain unit 22, a shunt negative impedance gain unit 23, a transformer 24 and a line buildout network 25. The polarity guard 21 permits the circuit to operate with reversal of battery between tip and ring. The negative impedance voice frequency amplifier comprised of units 22 and 23 provides gain (e.g., 4 or 6 db) into loaded loops of any gauge with 2,200 to 3,600 ft. end sections; the requisite current is supplied to the gain units from the central office. The line buildout network 25 is used to obtain a proper impedance transformation to match gain units 22, 23 to the loop to maintain a satisfactory return loss characteristic. The circuit components 21–25 are now conventional in range extender, repeater circuits (see the above-noted patent to Henry-Schimpf) and further description therefore is not necessary. As in the Henry-Schimpf patent, a negative voltage (e.g., −78 V) is supplied to transformer 24 to increase the output of the transmitter of the subscriber set.

The resistance 26 and diode 27 are connected in series with the repeater coil and this series circuit is connected in shunt with the gain unit 23. The capacitance 28 shunts the series connected resistance 26 and diode 27. The resistance 26 serves to control dc current level and its value is selected so that the amplifier circuit presents an impedance of 1,000 ohms to the office side of the loop. That is, from the office side, the repeater amplifier circuit looks like a 1,000 ohm impedance to low frequencies — such as dc and repeated dial pulse signals. This 1,000 ohm impedance consists of the impedance of gain unit 22 connected in series with the dual path shunt circuit comprised of gain unit 23 and its parallel connected path consisting of the repeater coil, resistance 26 and diode 27. In a typical embodiment, a resistance 26 of 1K and a capacitance 28 of 4 $\mu$F were used. The shunt capacitance 28 serves to keep the ac path intact.

The diode 27 is a light emitting diode (LED) and it forms a part of the optoelectronic coupler 20 that is utilized herein to detect an ANI tip party test. Optoelectronic couplers are commercially available (e.g., Motorola Semiconductor Products, Inc.) and are used in a variety of applications requiring high electrical isolation, small package size, high current transfer ratios, etc. A typical coupled may comprise a pn infrered light emitting diode 27 and an npn phototransistor 29. Normally, with the repeater 13 connected in the loop, the dc current through the diode 27 causes the same to emit light energy ($\lambda$) which impinges on the phototransistor 29 causing it to conduct. However, with an ANI tip party test, the repeater amplifier current goes to zero, as heretofore described, and the light emission by the diode 27 ceases. This abruptly terminates conduction through the transistor 29 and the resultant current step is coupled to the RPR relay causing it to drop.

There is, of course, no current through the LED 27 at other times in a call sequence (e.g., a dial break) and hence provision must be made to prevent the delivery of erroneous (pseudo-ANI) drop signals to the ROR relay. The necessary logic for this will be covered hereinafter.

Figure 3:
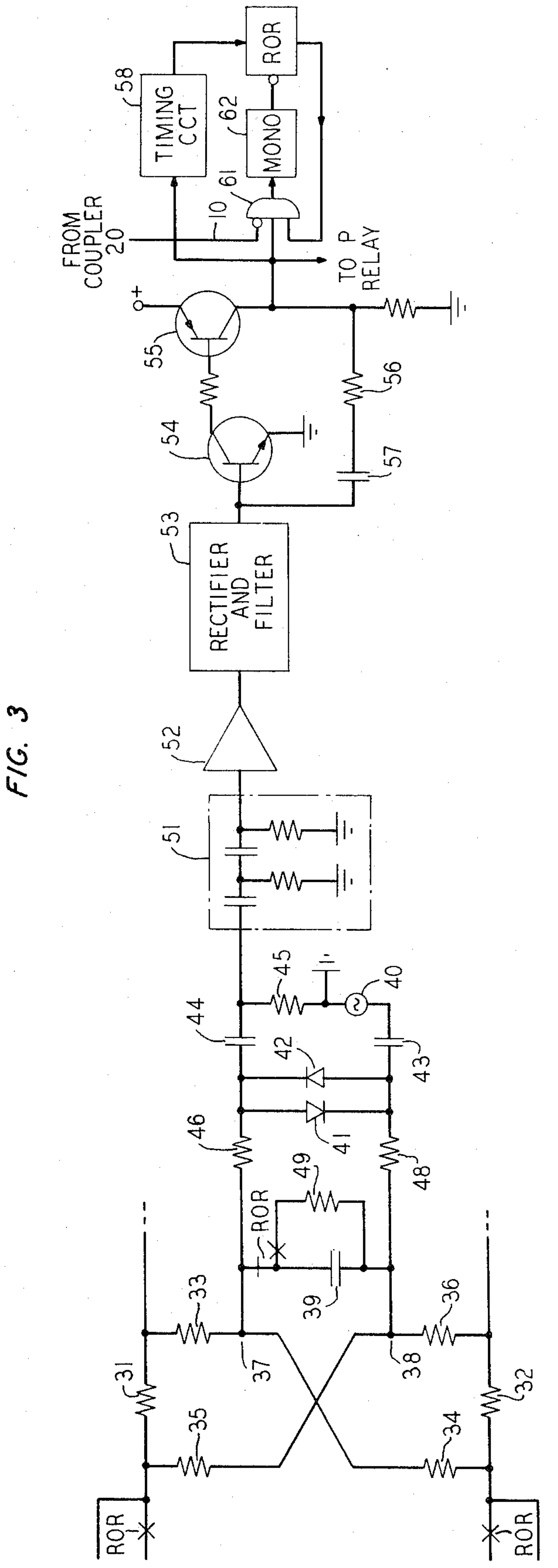
FIG. 3 is a detailed schematic diagram, partly in black, of the loop current detector and relay control circuit of FIG. 1.

Turning now to the detailed schematic diagram of FIG. 3, the loop current detector and relay control circuitry illustrated therein comprises resistors 31 and 32, of low resistance, connected respectively in the tip and ring paths of the loop. Resistances 33 and 34 and resistances 35 and 36 constitute two branches cross-connected between resistors 31 and 32. The high resistive values of resistances 33–36 cause negligible transmission loss, negligible coupling of the sensing frequency to the loop, and minimize measurement errors made from the local test desk. A pair of diodes 41 and 42 are connected with opposite polarity across points 37 and 38 of the bridge. The resistors 46 and 48 are for isolation purposes. A sensing frequency source 40 produces a sine wave signal of low power (100 mV RMS) and of the order of 18 kHz, which is coupled through capacitance 43 to the diodes 41 and 42. A pair of diodes are required because of possible battery reversal between the tip and ring paths. The signal passed by one of the diodes is coupled by the capacitance 44 to the resistance 45.

The dc current in the loop produces a small voltage drop across resistors 31 and 32. This, in turn, produces a voltage across the points 37 and 38 which is linearly proportional to loop current and which tends to forward-bias one of the oppositely poled diodes 41, 42 depending on the voltage polarity. The resistance of the conductive diode will be an inverse function of its forward-bias. That is, the greater the forward-bias, the smaller the diode resistance, and consequently the larger the signal developed across the resistance 45. Thus, the magnitude (RMS) of the sine wave signal developed across resistance 45 is directly proportional to the current in the loop.

With the loop current detector 15 in its slow mode, the capacitance 39 is connected across the points 37 and 38 of the bridge by means of a break contact of the ROR relay. The capacitance 39, in conjunction with the bridge resistances 33–36, provides a relatively slow rise-fall time response (i.e., 150 ms) and therefore serves to effectively filter out the various transient loop current, heretofore described, that could cause an erroneous shunting of the loop by the resistive shunt path. It also linearly averages the loop current to allow the sensing of ring trip during the ringing interval. However, when the ROR relay is eventually enabled, the capacitance 39 is removed from the bridge circuit and discharged through the resistance 49, all by means of the respective break and make contacts of the ROR relay. The loop current detector 15 is thus switched to its fast detection mode.

The signal developed across resistance 45 is coupled by the high pass filter 51 to the input of amplifier 52. The RC filter 51 serves to pass the 18 kHz sensing frequency, while rejecting the 20 Hz ringing voltage and 60 Hz power line induction voltage and their harmonics. The output of amplifier 52 is delivered to the rectifier-filter 53. The rectifier can be a half-wave voltage-doubler and its filter a conventional combination of resistance and capacitance. The latter filter provides smoothing and the integration effect, noted above, which delays (by about 20 ms) the make and break of the P relay in response to dial pulses.

The output of rectifier-filter 53 is coupled to a threshold current detector circuit comprised of transistors 54 and 55. As the name inplies, when the input signal exceeds the threshold level (in this case, the input transistor potential barrier level) the transistors 54 and 55 are driven into conduction. The resistance 56 and capacitance 57 comprise a positive feedback for the purpose of achieving the 40 ms dynamic hysteresis, noted hereinbefore. Once the current detector circuit has been turned on, it will stay on for at least 40 ms and once it turns off it will stay off for 40 ms.

The current detector directly operates the P relay through a relay driver circuit (not shown). It also operates the ROR relay through the timing circuit 58. The timing circuit serves to quickly enable the ROR relay in response to a current detector output signal, but it delays the drop of the same by about 200 ms, as hereinbefore described. This timing is readily achieved by providing a charging capacitance with a fast charge, and a slow discharge, path. The RC time constant of the discharge path determines the duration of the delayed drop.

The AND gate 61 provides the necessary logic function for dropping the ROR relay in response to, and only in response to, an ANI tip party test. During an ANI test, it will be recalled, the current through the LED 27 is interrupted and the output signal from the optoelectronic coupler 20 goes to zero. There are, however, two other instances during a call sequence when the coupler 20 output is zero and yet we do not wish to drop or inhibit the ROR relay at these times. During a dial break, for example, the coupler 20 output goes to zero (the P relay is open), but the repeater must be maintained on line over dial pulsing in accordance with the invention. Also, the delivery of an inhibit signal (pseudo-ANI) to the ROR relay must be prevented when the subscriber first goes off-hook but sufficient time has not elapsed to operate the ROR relay. The following logical statement defines the conditions under which the ROR relay is dropped (in response to an ANI tip party test):

IF, ROR relay is "on." loop current is detected · coupler 20 output is zero → drop ROR.

The gate 61 and the input signals thereto meet these conditions. For example, at the start of an ANI tip party test, the repeater is connected to the loop by the energized ROR relay, the −78 V boosted battery is providing the requisite loop current in the subscriber's side of the loop, and the coupler 20 output signal is zero, as heretofore described, thus removing the inhibit input to gate 61. The gate 61 is, therefore, enabled at this time and the monopulser 62 is caused to deliver a short duration inhibit or drop signal to the ROR relay. In contrast, during a dial break, for example, there is no signal from the coupler 20, but there is also no loop current and hence the gate 61 remains disabled.

The present invention has been described by reference to a particular embodiment. It is to be understood, however, that the described embodiment is merely illustrative of the pcinciples and applications of the present invention and numerous modifications may be made by those skilled in the art without departing from the spirit and scope of the invention.

What is claimed is:

1. A range extender for long subscriber loops interconnecting subscriber telephone sets to a central office comprising a through transmission path, a voice transmission path including an amplifier means, relay means for transferring back and forth between paths to establish a loop connection through said through transmission path or said voice transmission path, loop current detector means coupled to said loop and having two modes of operation, said detector means being normally in a slow detection mode to inhibit the detection of current in said loop except that due to an off-hook condition of the subscriber set, control means responsive to a current detection output signal from said detector means to enable said relay means to connect said amplifier means to said loop and to switch said current detector means to a fast detection mode for rapid detection of dial pulses, said control means serving to maintain said relay means in the enabled state for a predetermined period after a termination of said current detection output signal, said predetermined period being substantially longer than the longest possible dial break, and second relay means responsive to the detection of dial pulses by said detector means in its fast detection mode to open and close the office side of the loop through said amplifier means.

2. A range extender as defined in claim 1 wherein said amplifier means presents a low resistance at low frequencies to the office side of the loop.

3. A range extender as defined in claim 2 wherein said office side of the loop is opened and closed by said second relay means with a predetermined delay to provide noise immunity.

4. A range extender as defined in claim 3 including dynamic hysteresis means for maintaining the second relay means in its enabled or disabled state for a predetermined minimum period of time.

5. A range extender as defined in claim 1 including means for detecting an automatic number identification (ANI) tip party test and for rapidly disabling the first-recited relay means in response thereto.

6. A range extender as defined in claim 5 wherein the tip party test detection means comprises an optoelectronic coupler with a light emitting diode connected to said amplifier means to detect when the current through the latter goes to zero.

7. A range extender as defined in claim 6 wherein said tip party test detection means includes logic means for coupling the output signal from said optoelectronic coupler to the first-recited relay means, said logic means serving to disable said first-recited relay means in response to, and only in response to, said tip party test.

* * * * *